(12) United States Patent
Chen et al.

(10) Patent No.: US 11,444,861 B2
(45) Date of Patent: Sep. 13, 2022

(54) METHOD AND APPARATUS FOR DETECTING TRAFFIC

(71) Applicant: Beijing Baidu Netcom Science and Technology Co., Ltd., Beijing (CN)

(72) Inventors: Yajing Chen, Beijing (CN); Bing Huang, Beijing (CN); Qingzhi Zhou, Beijing (CN); Shaoyan Wang, Beijing (CN)

(73) Assignee: Beijing Baidu Netcom Science and Technology Co., Ltd., Beijing (CN)

(*) Notice: Subject to any disclaimer, the term of this patent is extended or adjusted under 35 U.S.C. 154(b) by 352 days.

(21) Appl. No.: 16/676,028

(22) Filed: Nov. 6, 2019

(65) Prior Publication Data

US 2020/0296022 A1   Sep. 17, 2020

(30) Foreign Application Priority Data

Mar. 15, 2019 (CN) .......................... 201910198336.6

(51) Int. Cl.
*H04L 43/0876* (2022.01)
*H04L 43/062* (2022.01)

(52) U.S. Cl.
CPC ........ *H04L 43/0876* (2013.01); *H04L 43/062* (2013.01)

(58) Field of Classification Search
None
See application file for complete search history.

(56) References Cited

U.S. PATENT DOCUMENTS

| 2002/0091859 | A1* | 7/2002 | Tuomenoksa | H04L 61/00 709/245 |
|---|---|---|---|---|
| 2005/0022000 | A1 | 1/2005 | Inomata et al. | |
| 2008/0117820 | A1 | 5/2008 | Miyazaki et al. | |
| 2016/0219067 | A1 | 7/2016 | Han | |

FOREIGN PATENT DOCUMENTS

| CN | 103905451 A | 7/2014 |
|---|---|---|
| CN | 107483455 A | 12/2017 |
| CN | 107508816 A | 12/2017 |
| CN | 108234524 A | 6/2018 |
| CN | 109413071 A | 3/2019 |
| JP | 2005044277 A | 2/2005 |
| JP | 2007082242 A | 3/2007 |
| JP | 2008131198 A | 6/2008 |
| KR | 10-1187023 A | 9/2012 |
| KR | 10-2015-0033820 A | 4/2015 |

* cited by examiner

*Primary Examiner* — Angela Nguyen
(74) *Attorney, Agent, or Firm* — Nixon Peabody LLP

(57) ABSTRACT

Embodiments of the present disclosure relate to a method and apparatus for detecting traffic. The method includes: acquiring traffic information of at least two dimensions of a target IP; determining whether the traffic information of the at least two dimensions contains traffic information exceeding an abnormal traffic threshold of a corresponding dimension of the target IP; and in response to determining that the traffic information of the at least two dimensions contains the traffic information exceeding the abnormal traffic threshold of the corresponding dimension, determining that the traffic of the target IP is abnormal.

15 Claims, 6 Drawing Sheets

METHOD AND APPARATUS FOR DETECTING TRAFFIC

CROSS-REFERENCE TO RELATED APPLICATIONS

This application claims priority to Chinese Application No. 201910198336.6, filed on Mar. 15, 2019 and entitled "Method and Apparatus for Detecting Traffic," the entire disclosure of which is hereby incorporated by reference.

TECHNICAL FIELD

Embodiments of the present disclosure relate to the field of computer technology, and specifically to a method and apparatus for detecting traffic.

BACKGROUND

With the development of society and the gradual popularization of network applications, the development of networks has brought great convenience to people, but also brought more security risks. Therefore, it is particularly important to detect network anomalies accurately and timely, identify and clean attacks, and ensure the reliability of service usage.

The recognition of abnormal traffic is the premise of detecting an attack. Only when the abnormal traffic is identified, whether the attack is a real attack is required to be further analyzed.

In some related technologies, whether the current traffic is abnormal is usually detected by matching the extracted traffic feature value with a pre-established feature library.

SUMMARY

Embodiments of the present disclosure provide a method and apparatus for detecting traffic.

In a first aspect, an embodiment of the present disclosure provides a method for detecting traffic, including: acquiring traffic information of at least two dimensions of a target IP; determining whether the traffic information of the at least two dimensions contains traffic information exceeding an abnormal traffic threshold of a corresponding dimension of the target IP; and in response to determining that the traffic information of the at least two dimensions contains the traffic information exceeding the abnormal traffic threshold of the corresponding dimension, determining that the traffic of the target IP is abnormal.

In some embodiments, the traffic information of the at least two dimensions includes at least two of the following: bits transmitted per unit time, packets transmitted per unit time, requests per unit time, or connections per unit time.

In some embodiments, before determining whether the traffic information of the at least two dimensions contains the traffic information exceeding the abnormal traffic threshold of the corresponding dimension of the target IP, the method further includes: periodically acquiring traffic information of the target IP; removing abnormal traffic information exceeding a preset value range from the acquired traffic information; and determining an abnormal traffic threshold of the target IP based on the traffic information after removing the abnormal traffic information.

In some embodiments, the periodically acquiring traffic information of the target IP includes: performing traffic acquisition on the target IP at a preset frequency; and determining, for sample data acquired each time, an interval in which the sample data is included, and determining a preset value within the interval as the traffic information acquired that time.

In some embodiments, the removing abnormal traffic information exceeding a preset value range from the acquired traffic information includes: removing abnormal traffic information exceeding a first value range from the acquired traffic information to obtain preliminarily screened traffic information; determining a second value range based on the preliminarily screened traffic information, the second value range being smaller than the first value range; and removing abnormal traffic information exceeding the second value range from the preliminarily screened traffic information.

In some embodiments, the determining an abnormal traffic threshold of the target IP based on the traffic information after removing the abnormal traffic information includes: acquiring a set of traffic information obtained in a current period after removing the abnormal traffic information; determining an interval in which a preset proportion of traffic information in the set is included, an upper limit of the interval being used as a reference threshold; and amplifying the reference threshold by a preset multiple to obtain the abnormal traffic threshold of the target IP.

In some embodiments, the determining an abnormal traffic threshold of the target IP based on the traffic information after removing the abnormal traffic information includes: acquiring a set of traffic information obtained in a plurality of periods after removing the abnormal traffic information, the plurality of periods including a current period and a plurality of historical periods; determining, for the set of traffic information obtained in each period, an interval in which a preset proportion of traffic information in the set is included, an upper limit of the determined interval being used as a reference threshold corresponding to the period; determining a final threshold based on the reference thresholds corresponding to the plurality of periods and corresponding weights; and amplifying the final threshold by a preset multiple to obtain the abnormal traffic threshold of the target IP.

In some embodiments, the weights of the plurality of periods are determined by one of the following approaches: the weight of each period is the same; the weight of the period close to the current period is greater than that of the period far from the current period; or the weight of each period is determined based on the stability of the traffic information.

In a second aspect, an embodiment of the present disclosure provides an apparatus for detecting traffic, including: an information acquisition unit, configured to acquire traffic information of at least two dimensions of a target IP; a judgment unit, configured to determine whether the traffic information of the at least two dimensions contains traffic information exceeding an abnormal traffic threshold of a corresponding dimension of the target IP; and an abnormality determination unit, configured to determine that the traffic of the target IP is abnormal in response to determining that the traffic information of the at least two dimensions contains the traffic information exceeding the abnormal traffic threshold of the corresponding dimension.

In some embodiments, the traffic information of the at least two dimensions includes at least two of the following: bits transmitted per unit time, packets transmitted per unit time, requests per unit time, or connections per unit time.

In some embodiments, the apparatus further includes: an information acquisition unit, configured to periodically acquire traffic information of the target IP; a removal unit, configured to remove abnormal traffic information exceeding a preset value range from the acquired traffic information; and a threshold determination unit, configured to determine an abnormal traffic threshold of the target IP based on the traffic information after removing the abnormal traffic information.

In some embodiments, the information acquisition unit includes: an information acquisition module, configured to perform traffic acquisition on the target IP at a preset frequency; and an information determination module, configured to determine, for sample data acquired each time, an interval in which the sample data is included, and determine a preset value within the interval as the traffic information acquired that time.

In some embodiments, the removal unit includes: a first removal module, configured to remove abnormal traffic information exceeding a first value range from the acquired traffic information to obtain preliminarily screened traffic information; a range determination module, configured to determine a second value range based on the preliminarily screened traffic information, the second value range being smaller than the first value range; and a second removal module, configured to remove abnormal traffic information exceeding the second value range from the preliminarily screened traffic information.

In some embodiments, the threshold determination unit includes: a set acquisition module, configured to acquire a set of traffic information obtained in a current period after removing the abnormal traffic information; a range determination module, configured to determine an interval in which a preset proportion of traffic information in the set is included, an upper limit of the interval being used as a reference threshold; and a threshold determination module, configured to amplify the reference threshold by a preset multiple to obtain the abnormal traffic threshold of the target IP.

In some embodiments, the threshold determination unit includes: a set acquisition module, configured to acquire a set of traffic information obtained in a plurality of periods after removing the abnormal traffic information, the plurality of periods including a current period and a plurality of historical periods; a range determination module, configured to determine, for the set of traffic information obtained in each period, an interval in which a preset proportion of traffic information in the set is included, an upper limit of the determined interval being used as a reference threshold corresponding to the period; a correction module, configured to determine a final threshold based on the reference thresholds corresponding to the plurality of periods and corresponding weights; and a threshold determination module, configured to amplify the final threshold by a preset multiple to obtain the abnormal traffic threshold of the target IP.

In some embodiments, the weights of the plurality of periods are determined by one of the following approaches: the weight of each period is the same; the weight of the period close to the current period is greater than that of the period far from the current period; or the weight of each period is determined based on the stability of the traffic information.

In a third aspect, an embodiment of the present disclosure provides an electronic device, including: one or more processors; and a storage apparatus storing one or more programs; where the one or more programs, when executed by the one or more processors, cause the one or more processors to implement the method described in any implementation of the first aspect.

In a fourth aspect, an embodiment of the present disclosure provides a computer readable medium storing a computer program, where when the computer program is executed by a processor, the method as described in any implementation of the first aspect is implemented.

In the method and apparatus for detecting traffic according to some embodiments of the present disclosure, traffic information of at least two dimensions of a target IP is acquired, then whether the traffic information of the at least two dimensions contains traffic information exceeding a threshold of a corresponding dimension is determined, and abnormal traffic is determined when the traffic information of the at least two dimensions contains the traffic information exceeding the threshold of the corresponding dimension, so that the detection rate of the abnormal traffic is improved.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
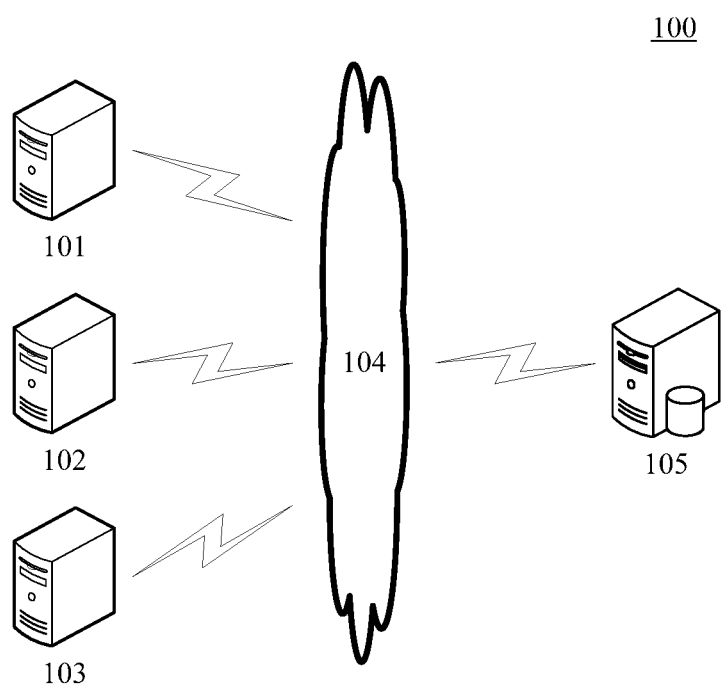
FIG. 1 is a diagram of an example system architecture in which an embodiment of the present disclosure may be implemented.

FIG. 1 shows an example system architecture 100 in which a method for detecting traffic or an apparatus for detecting traffic according to embodiments of the present disclosure may be implemented.

As shown in FIG. 1, the system architecture 100 may include an electronic device 101, 102 or 103, a network 104, and a server 105. The network 104 serves as a medium providing a communication link between the electronic device 101, 102 or 103 and the server 105. The network 104 may include various types of connections, such as wired or wireless communication links, or optical fiber cables.

The electronic device 101, 102 or 103 may be a server (for example, a server that is deployed at a cloud and is capable of providing specific services), or a terminal device (for example, a smart phone, a laptop portable computer, a desktop computer, etc. connected to the network). Each electronic device may represent an IP (Internet Protocol).

The server 105 may be a server providing various services, for example, a backend server for detecting the abnormity of network traffic of the electronic device 101, 102 or 103. The backend server may analyze the received data such as traffic information to determine whether the electronic device 101, 102 or 103 has abnormal traffic.

It should be noted that the method for detecting traffic according to some embodiments of the present disclosure is generally executed by the server 105. Accordingly, the apparatus for detecting traffic is generally provided in the server 105.

It should be understood that the numbers of the electronic devices, the network and the server in FIG. 1 are merely illustrative. Any number of electronic devices, networks and servers may be provided based on actual requirements.

Figure 2:
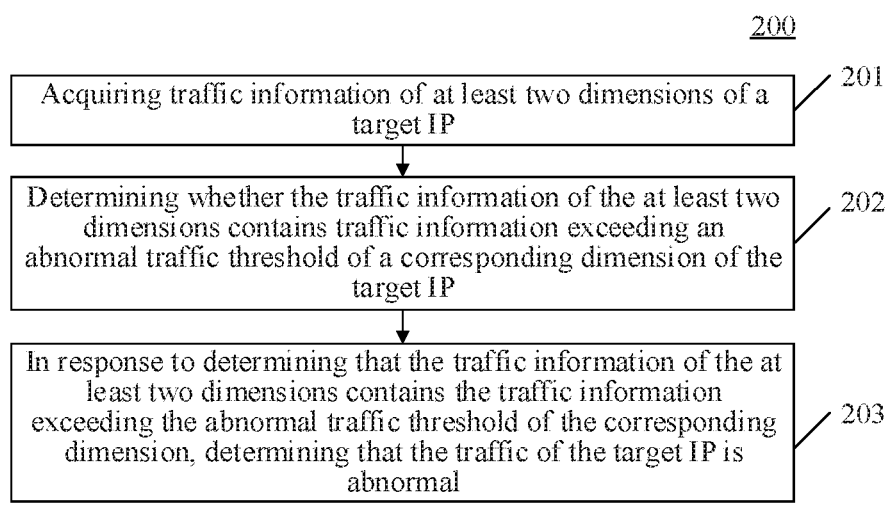
FIG. 2 is a flowchart of a method for detecting traffic according to an embodiment of the present disclosure.

Further referring to FIG. 2, a flow 200 of a method for detecting traffic according to an embodiment of the present disclosure is shown. The method for detecting traffic may include the following steps.

Step 201: acquiring traffic information of at least two dimensions of a target IP.

In some embodiments, an executing body (for example, the server 105 in FIG. 1) on which the method for detecting traffic is performed may acquire the traffic information of at least two dimensions of the target IP (for example, the electronic device 101, 102 or 103 in FIG. 1). The target IP may be one of the IPs managed by the executing body. The traffic information may be information capable of characterizing the network state of the target IP, for example, bits per second, packets per second, etc.

In some optional implementations of some embodiments, the traffic information of the at least two dimensions may include at least two of the following: bits transmitted per unit time (e.g., bits per second), packets transmitted per unit time (e.g., packets per second), requests per unit time (e.g., requests per second), or connections per unit time (e.g., connections per second).

It should be noted that the traffic information of one dimension is described as bits transmitted per unit time in the foregoing implementation, but some embodiments is not limited thereto. It should be understood that bytes transmitted per unit time may also be used as the traffic information of the dimension by those skilled in the art.

Here, the traffic information of at least two dimensions may be acquired simultaneously during a detection period. For example, bits transmitted, packets transmitted, requests and connections for the target IP are simultaneously acquired to obtain the traffic information of the target IP on the four dimensions.

Step 202: determining whether the traffic information of the at least two dimensions contains traffic information exceeding an abnormal traffic threshold of a corresponding dimension of the target IP.

In some embodiments, the executing body (for example, the server 105 in FIG. 1) on which the method for detecting traffic is performed may compare the traffic information of the at least two dimensions with the abnormal traffic thresholds of the corresponding dimensions respectively to determine whether the traffic information of the at least two dimensions contains traffic information exceeding the abnormal traffic threshold of the corresponding dimension. Here, the abnormal traffic threshold corresponding to a certain dimension may be used to judge whether the traffic information of the dimension is within a normal range of the dimension, and may be a preset value, for example, 100 Mbps.

Step 203: in response to determining that the traffic information of the at least two dimensions contains the traffic information exceeding the abnormal traffic threshold of the corresponding dimension, determining that the traffic of the target IP is abnormal.

In some embodiments, if it is determined in step 202 that the traffic information of the at least two dimensions contains the traffic information exceeding the abnormal traffic threshold of the corresponding dimension, the executing body (for example, the server 105 in FIG. 1) on which the method for detecting traffic is performed may determine that the traffic of the target IP is abnormal (i.e., the target IP is attacked or may be attacked).

As an example, the traffic information of the target IP on a bit dimension and a packet dimension, i.e., 200 megabits per second and 700 packets per second, is first acquired, and then the traffic information of the two dimensions is respectively compared with the abnormal traffic thresholds corresponding to the respective dimensions (for example, the abnormal traffic threshold corresponding to the bit dimension is 300 megabits per second, and the abnormal traffic threshold corresponding to the packet dimension is 500 packets per second). Because the traffic information (i.e., 700 packets per second) on the packet dimension exceeds the abnormal traffic threshold (i.e., 500 packets per second) corresponding to the packet dimension, it can be determined that the traffic of the target IP is abnormal.

It can be found through the above example that, if the traffic of the target IP is detected only from the bit dimension, the traffic of the target IP is considered to be normal. The traffic of the target IP is detected from at least two dimensions in some embodiments of the present disclosure. As long as the traffic information on one dimension exceeds the abnormal traffic threshold, the traffic of the target IP is considered to be abnormal, thereby greatly improving the detection rate of the abnormal traffic.

In the method for detecting traffic according to some embodiments of the present disclosure, traffic information of at least two dimensions of a target IP is acquired, then whether the traffic information of the at least two dimensions contains traffic information exceeding a threshold of corresponding dimension is determined, and abnormal traffic is determined when the traffic information of the at least two dimensions contain the traffic information exceeding the threshold of the corresponding dimension, so that the detection rate of the abnormal traffic is improved.

Figure 3:
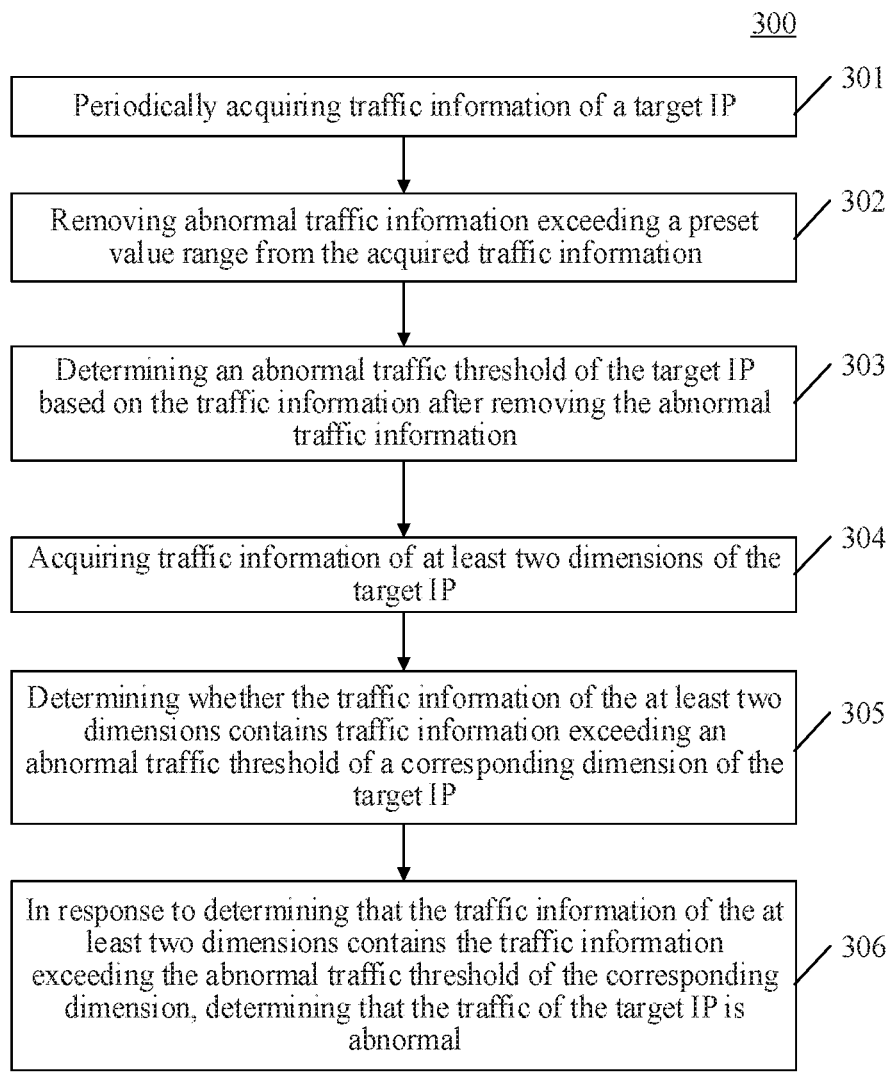
FIG. 3 is a flowchart of the method for detecting traffic according to another embodiment of the present disclosure.

Further referring to FIG. 3, a flow 300 of the method for detecting traffic according to another embodiment of the present disclosure is shown. The method for detecting traffic may include the following steps.

Step 301: periodically acquiring traffic information of a target IP.

In some embodiments, an executing body (for example, the server 105 in FIG. 1) on which the method for detecting traffic is performed may periodically acquire the traffic information of the target IP. Here, the target IP may be one of the IPs managed by the executing body. The traffic information may be information capable of characterizing the network state of the target IP, for example, bits per second, packets per second, etc.

As an example, the executing body may perform traffic acquisition on the target IP at a fixed frequency, and use the acquired sample data as the traffic information of the target IP.

In some optional implementations of some embodiments, step 301 specifically may include the following steps: first, performing traffic acquisition on the target IP at a preset frequency (for example, once per second); and then, for sample data acquired each time, determining an interval in which the sample data is included, and determining a preset value within the interval as the traffic information acquired that time. For example, if the sample data acquired is 158 packets per second, the sample data may be approximated to an interval [100, 200](this interval may be empirically set without affecting the detection result), and then, the sample data is rounded up to obtain 200 packets per second as the traffic information acquired this time. By approximating and rounding the acquired sample data, the storage overhead can be effectively saved without affecting the determination result.

Although the above example describes determining the traffic information acquired each time by rounding up, the present disclosure is not limited thereto. It can be understood by those skilled in the art that the traffic information acquired each time may also be determined by other ways, for example, rounding down, taking an intermediate value of the interval (e.g., 150), etc.

In addition, it should be noted that, when the traffic information of the target IP includes traffic information of at least two dimensions, the traffic information of the at least two dimensions may be acquired at the same time or in sequence, which is not limited here.

Step 302: removing abnormal traffic information exceeding a preset value range from the acquired traffic information.

In some embodiments, the executing body (for example, the server 105 in FIG. 1) on which the method for detecting traffic is performed may remove the abnormal traffic information exceeding the preset value range from the traffic information acquired in step 301. Because the traffic information acquired in step 301 may contain abnormal traffic information (that is, traffic information exceeding the preset value range), the abnormal traffic information needs to be removed. Here, the preset value range may be a value preset based on an empirical value, or a value determined based on the acquired data during execution.

In some optional implementations of some embodiments, the preset value range may include a first value range and a second value range. The first value range may be a fixed threshold set based on experience, the second value range may be a value determined during execution of the method, and the first value range is greater than the second value range.

Corresponding to the implementation, step 302 may specifically include the following steps.

Step 1: removing abnormal traffic information exceeding a first value range (for example, greater than a fixed threshold) from the traffic information acquired in step 301 to obtain preliminarily screened traffic information. Through preliminary screening, the obviously abnormal traffic information can be removed.

Step 2: determining a second value range based on the preliminarily screened traffic information. As an example, a standard variance $\sigma$ and a mean $\mu$ are determined using the preliminarily screened traffic information as sample points, and the second value range may be determined as $(\mu-3\sigma, \mu+3\sigma)$. According to the principle of $3\sigma$, the probability that the value is distributed within the $(\mu-3\sigma, \mu+3\sigma)$ is 0.9974. Therefore, the sample point not in the range may be considered as an abnormal point.

Step 3: removing abnormal traffic information exceeding the second value range from the preliminarily screened traffic information. For example, the traffic information not within $(\mu-3\sigma, \mu+3\sigma)$ is removed.

Although the above example describes determining the second value range using the principle of $3\sigma$, the present disclosure is not limited thereto. It can be appreciated by those skilled in the art that the second value range may also be determined by other suitable ways.

Step 303: determining an abnormal traffic threshold of the target IP based on the traffic information after removing the abnormal traffic information.

In some embodiments, the executing body (for example, the server 105 in FIG. 1) on which the method for detecting traffic is performed may determine the abnormal traffic threshold of the target IP by using the traffic information obtained in step 302. Here, the abnormal traffic threshold of the target IP may include abnormal traffic thresholds of at least two dimensions. The abnormal traffic threshold corresponding to a certain dimension may be used to judge whether the traffic information of the dimension is within a normal range of the dimension.

In some optional implementations of some embodiments, step 303 may specifically include the following steps.

Step 1: acquiring a set of traffic information obtained in the current period after removing the abnormal traffic information.

Step 2: determining an interval in which a preset proportion of traffic information in the set is included, the upper limit of the interval being used as a reference threshold. The preset proportion may be a value preset based on experience, for example, 90%, 95%, etc.

Step 3: amplifying the reference threshold by a preset multiple to obtain the abnormal traffic threshold of the target IP. The preset multiple may be a value preset based on experience, for example, 2, 3, etc.

As an example, 100 samples of bits acquired on that day after removing the abnormal bits exceeding the first value range and the second value range are acquired first; then, the samples of bits are numerically sequenced from small to large, a histogram of sample distribution is drawn, an abscissa (i.e., the upper limit of an interval of 95% samples of bits) corresponding to 95% samples of bits (i.e., 95 samples of bits) is found, and the value of the abscissa is used as a reference threshold; and finally, the reference threshold is amplified by 2 times to obtain an abnormal traffic threshold for subsequent traffic detection of the target IP.

In addition, considering that a single period may be affected by the factors such as service peak and long-term attack, the value of single-period estimation has certain uncertainty, and multi-period data may be used for correction, so that the estimated abnormal traffic threshold is more accurate.

In some optional implementations of some embodiments, step 303 may specifically include the following steps.

Step 1: acquiring a set of traffic information obtained in a plurality of periods after removing the abnormal traffic information. The plurality of periods include a current period and a plurality of historical periods.

Step 2: for each period, determining an interval in which a preset proportion of traffic information in the set corresponding to the period is included, the upper limit of the determined interval being used as a reference threshold corresponding to the period.

Step 3: determining a final threshold based on the reference thresholds corresponding to the plurality of periods and corresponding weights.

Step 4: amplifying the final threshold by a preset multiple to obtain the abnormal traffic threshold of the target IP.

An example is given below.

First, 3000 samples of bits acquired in a plurality of days (e.g., 30 days) including the current day after removing the abnormal bits exceeding the first value range and the second value range may be acquired (assuming 100 samples of bits every day).

Thereafter, the samples of bits every day are processed to obtain a reference threshold corresponding to every day. Specifically, the samples of bits every day are numerically sequenced from small to large, a histogram of sample distribution is drawn, an abscissa (i.e., the upper limit of an interval of 95% samples of bits) corresponding to 95% samples of bits (i.e., 95 samples of bits) is found, and the value of the abscissa is used as a reference threshold corresponding to every day.

Then, the reference thresholds corresponding to the plurality of days are weighted and averaged to obtain a final threshold. Here, the weight of every day may be preset, for example, 1/n (n is the number of days).

Finally, the final threshold is amplified by 2 times to obtain an abnormal traffic threshold for subsequent traffic detection of the target IP.

In some optional implementations of some embodiments, the weights of the plurality of periods may be determined by one of the following approaches.

Approach 1: the weight of each period is the same, for example, 1/n (n is the number of days of each period);

Approach 2: the weight of the period close to the current period is large, for example, the ratio of the i-th period is 1/i (i is a natural number);

Approach 3: the weight of the period with stable traffic information is large, for example, when the traffic information of the i-th period is stable (the variance a of the traffic information of the i-th period is 0), the weight of the i-th period is $n_i$ ($n_i$ is the number of days of the i-th period); when the traffic information of the i-th period is unstable (the variance a of the traffic information of the i-th period is more than 0), the weight of the i-th period is $n_i/\sigma^2$.

It should be noted that the plurality of periods may be values preset as needed, for example, 5 days, 10 days, 2 months, etc.

In addition, when the number of periods covered by the historical data is smaller than a preset number of periods, the acquiring the set of traffic information in the preset number of periods may be regarded as acquiring a set of traffic information in the historical data of the target IP. For example, if the preset number of periods is 10 days, and the historical data produced by the target IP includes only the traffic information acquired in the last 2 days, the acquiring the set of traffic information in the 10 days may be regarded as acquiring a set of traffic information in the historical data (i.e., the historical data acquired in the last 2 days) of the target IP, which is not necessarily to acquire when the number of periods covered by the historical data is greater than or equal to the preset number of periods.

Step 304: acquiring traffic information of at least two dimensions of the target IP.

In some embodiments, the executing body (for example, the server 105 in FIG. 1) on which the method for detecting traffic is performed may acquire the traffic information of at least two dimensions of the target IP.

Step 305: determining whether the traffic information of the at least two dimensions contains traffic information exceeding an abnormal traffic threshold of a corresponding dimension of the target IP.

In some embodiments, the executing body (for example, the server 105 in FIG. 1) on which the method for detecting traffic is performed may compare the traffic information of the at least two dimensions acquired in step 304 with the abnormal traffic thresholds (the abnormal traffic thresholds determined in step 303) of the corresponding dimensions respectively to determine whether the traffic information of the at least two dimensions contains traffic information exceeding the abnormal traffic threshold of the corresponding dimension.

Step 306: in response to determining that the traffic information of the at least two dimensions contains the traffic information exceeding the abnormal traffic threshold of the corresponding dimension, determining that the traffic of the target IP is abnormal.

In some embodiments, if it is determined in step 305 that the traffic information of the at least two dimensions contains the traffic information exceeding the abnormal traffic threshold of the corresponding dimension, the executing body (for example, the server 105 in FIG. 1) on which the method for detecting traffic is performed may determine that the traffic of the target IP is abnormal (i.e., the target IP is attacked or may be attacked).

It can be seen from FIG. 3 that, compared with the corresponding embodiment of FIG. 2, the flow 300 of the method for detecting traffic in the present embodiment highlights the step of determining the abnormal traffic threshold. Therefore, the solution described in the present embodiment can dynamically adjust the abnormal traffic threshold of the target IP, thereby detecting the abnormal traffic more accurately. In addition, the abnormal traffic thresholds of different IPs are determined by using historical traffic information of the different IPs, and the traffic anomalies of the different IPs are treated differently, thereby reducing the missing report rate and false report rate of the abnormal traffic.

Figure 4:
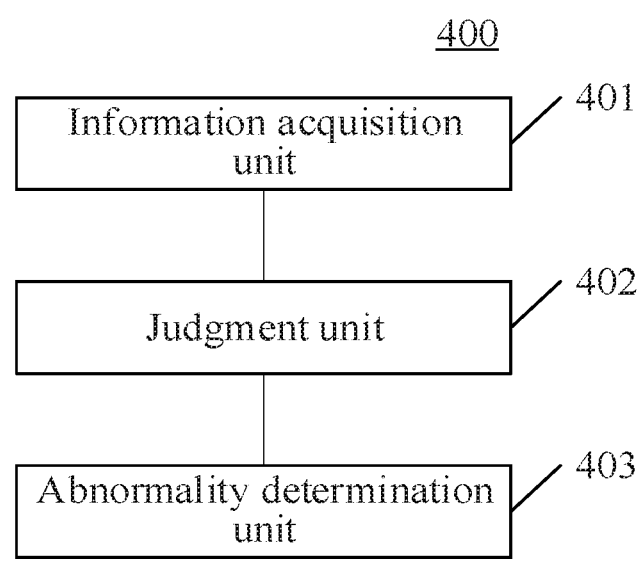
FIG. 4 is a schematic structural diagram of an apparatus for detecting traffic according to an embodiment of the present disclosure.

Further referring to FIG. 4, as an implementation of the method shown in FIG. 2, an embodiment of the present disclosure provides an apparatus for detecting traffic. An embodiment of the apparatus may correspond to the embodiment of the method shown in FIG. 2, and the apparatus may be applied to a server.

As shown in FIG. 4, the apparatus 400 for detecting traffic according to some embodiments may include an information acquisition unit 401, a judgment unit 402, and an abnormality determination unit 403. The information acquisition unit 401 may be configured to acquire traffic information of at least two dimensions of a target IP. The judgment unit 402 may be configured to determine whether the traffic information of the at least two dimensions contains traffic information exceeding an abnormal traffic threshold of a corresponding dimension of the target IP. The abnormality determination unit 403 may be configured to determine that the traffic of the target IP is abnormal in response to determining that the traffic information of the at least two dimensions contains the traffic information exceeding the abnormal traffic threshold of the corresponding dimension.

In the present embodiment, the acquisition unit 401 of the apparatus 400 for detecting traffic may acquire the traffic information of at least two dimensions of the target IP (for example, the electronic device 101, 102 or 103 in FIG. 1).

The target IP may be one of the IPs managed by the executing body. The traffic information may be information capable of characterizing the network state of the target IP, for example, bits per second, packets per second, etc.

In some optional implementations of the present embodiment, the traffic information of the at least two dimensions may include at least two of the following: bits transmitted per unit time (e.g., bits per second), packets transmitted per unit time (e.g., packets per second), requests per unit time (e.g., requests per second), or connections per unit time (e.g., connections per second).

In the present embodiment, the judgment unit 402 may compare the traffic information of the at least two dimensions with the abnormal traffic thresholds of the corresponding dimensions respectively to determine whether the traffic information of the at least two dimensions contains traffic information exceeding the abnormal traffic threshold of the corresponding dimension. Here, the abnormal traffic threshold corresponding to a certain dimension may be used to judge whether the traffic information of the dimension is within a normal range of the dimension, and the abnormal traffic threshold may be a preset value, for example, 100 Mbps.

In the present embodiment, in response to determining that the traffic information of the at least two dimensions contains the traffic information exceeding the abnormal traffic threshold of the corresponding dimension, the abnormality determination unit 403 may determine that the traffic of the target IP is abnormal (i.e., the target IP is attacked or may be attacked).

In the apparatus for detecting traffic according to some embodiments of the present disclosure, traffic information of at least two dimensions of a target IP is acquired, then whether the traffic information of the at least two dimensions contains traffic information exceeding a threshold of a corresponding dimension is determined, and abnormal traffic is determined when the traffic information of the at least two dimensions contains the traffic information exceeding the threshold of the corresponding dimension, so that the detection rate of the abnormal traffic is improved.

Figure 5:
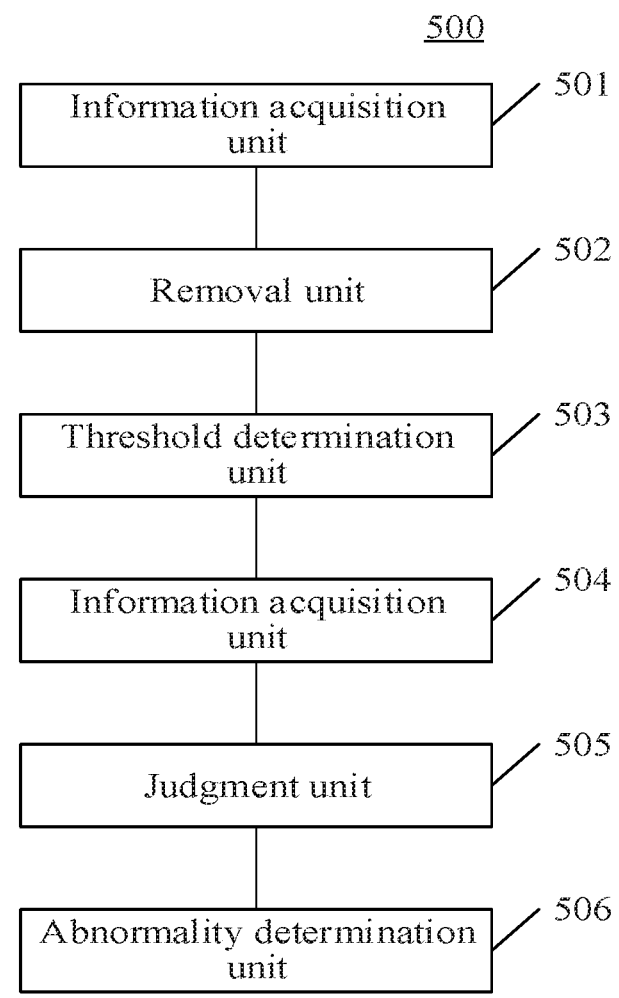
FIG. 5 is a schematic structural diagram of the apparatus for detecting traffic according to another embodiment of the present disclosure.

Further referring to FIG. 5, as an implementation of the method shown in FIG. 3, an embodiment of the present disclosure provides an apparatus for detecting traffic. An embodiment of the apparatus may correspond to the embodiment of the method shown in FIG. 3, and the apparatus may be applied to a server.

As shown in FIG. 5, the apparatus 500 for detecting traffic according to some embodiments may include an information acquisition unit 501, a removal unit 502, a threshold determination unit 503, an information acquisition unit 504, a judgment unit 505, and an abnormality determination unit 506. The information acquisition unit 501 may be configured to periodically acquire traffic information of a target IP. The removal unit 502 may be configured to remove abnormal traffic information exceeding a preset value range from the acquired traffic information. The threshold determination unit 503 may be configured to determine an abnormal traffic threshold of the target IP based on the traffic information after removing the abnormal traffic information. The information acquisition unit 504 may be configured to acquire traffic information of at least two dimensions of the target IP. The judgment unit 505 may be configured to determine whether the traffic information of the at least two dimensions contains traffic information exceeding an abnormal traffic threshold of a corresponding dimension of the target IP. The abnormality determination unit 506 may be configured to determine that the traffic of the target IP is abnormal in response to determining that the traffic information of the at least two dimensions contains the traffic information exceeding the abnormal traffic threshold of the corresponding dimension.

In the present embodiment, the information acquisition unit 501 of the apparatus 500 for detecting traffic according to some embodiments may periodically acquire the traffic information of the target IP. Here, the target IP may be one of the IPs managed by the executing body. The traffic information may be information capable of characterizing the network state of the target IP, for example, bits per second, packets per second, etc.

In some optional implementations of the present embodiment, the information acquisition unit may include an information acquisition module and an information determination module. The information acquisition module may be configured to perform traffic acquisition on the target IP at a preset frequency. The information determination module may be configured to determine, for sample data acquired each time, an interval in which the sample data is included, and determine a preset value within the interval as the traffic information acquired that time.

In the present embodiment, the removal unit 502 removes the abnormal traffic information exceeding the preset value range from the traffic information acquired by the information acquisition unit 501. Because the traffic information acquired by the information acquisition unit 501 may contain abnormal traffic information (that is, traffic information exceeding the preset value range), the abnormal traffic information needs to be removed. Here, the preset value range may be a value preset based on an empirical value, or a value determined based on the acquired data during execution.

In some optional implementations of the present embodiment, the preset value range may include a first value range and a second value range. The first value range may be a fixed threshold set based on experience, the second value range may be a value determined during execution of the method, and the first value range is greater than the second value range.

Corresponding to the implementation, the removal unit 502 may include a first removal module, a range determination module, and a second removal module. The first removal module may be configured to remove abnormal traffic information exceeding a first value range from the acquired traffic information to obtain preliminarily screened traffic information. The range determination module may be configured to determine a second value range based on the preliminarily screened traffic information, the second value range being smaller than the first value range. The second removal module may be configured to remove abnormal traffic information exceeding the second value range from the preliminarily screened traffic information.

In the present embodiment, the threshold determination unit 503 may determine the abnormal traffic threshold of the target IP by using the traffic information obtained by the removal unit 502. Here, the abnormal traffic threshold of the target IP may include abnormal traffic thresholds of at least two dimensions. The abnormal traffic threshold corresponding to a certain dimension may be used to judge whether the traffic information of the dimension is within a normal range of the dimension.

In some optional implementations of the present embodiment, the threshold determination unit 503 may include a set acquisition module, a range determination module, and a threshold determination module. The set acquisition module may be configured to acquire a set of traffic information obtained in a current period after removing the abnormal traffic information. The range determination module may be configured to determine an interval in which a preset proportion of traffic information in the set is included, an upper limit of the interval being used as a reference threshold. The threshold determination module may be configured to amplify the reference threshold by a preset multiple to obtain the abnormal traffic threshold of the target IP.

In some optional implementations of the present embodiment, the threshold determination unit 503 may include a set acquisition module, a range determination module, a correction module, and a threshold determination module. The set acquisition module may be configured to acquire a set of traffic information obtained in a plurality of periods after removing the abnormal traffic information, the plurality of periods including a current period and a plurality of historical periods. The range determination module may be configured to determine, for the set of traffic information obtained in each period, an interval in which a preset proportion of traffic information in the set is included, an upper limit of the determined interval being used as a reference threshold corresponding to the period. The correction module may be configured to determine a final threshold based on the reference thresholds corresponding to the plurality of periods and corresponding weights. The threshold determination module may be configured to amplify the final threshold by a preset multiple to obtain the abnormal traffic threshold of the target IP.

In some optional implementations of the present embodiment, the weights of the plurality of periods may be determined by one of the following approaches: the weight of each period is the same, the weight of the period close to the current period is greater than that of the period far from the current period, or the weight of each period is determined based on the stability of the traffic information.

In the present embodiment, the acquisition unit 504 may acquire traffic information of at least two dimensions of the target IP.

In the present embodiment, the judgment unit 505 may compare the traffic information of the at least two dimensions acquired by the acquisition unit 504 with the abnormal traffic thresholds of the corresponding dimensions respectively to determine whether the traffic information of the at least two dimensions contains traffic information exceeding the abnormal traffic threshold of the corresponding dimension.

In the present embodiment, in response to determining that the traffic information of the at least two dimensions contains the traffic information exceeding the abnormal traffic threshold of the corresponding dimension, the abnormality determination unit 506 may determine that the traffic of the target IP is abnormal (i.e., the target IP is attacked or may be attacked).

It can be seen from FIG. 5 that, compared with the corresponding embodiment of FIG. 4, the apparatus 500 for detecting traffic in the present embodiment highlights the units for determining the abnormal traffic thresholds. Therefore, the solution described in the present embodiment can dynamically adjust the abnormal traffic thresholds of the target IP, thereby detecting the abnormal traffic more accurately. In addition, the abnormal traffic thresholds of different IPs are determined by using historical traffic information of the different IPs, and the traffic anomalies of the different IPs are treated differently, thereby reducing the missing report rate and false report rate of the abnormal traffic.

Hereinafter, referring to FIG. 6, a schematic structural diagram of an electronic device (e.g., the electronic device 101, 102 or 103 in FIG. 1) 600 adapted to implement some embodiments of the present disclosure is shown. The electronic device shown in FIG. 6 is just an example, which does not impose any restrictions on the functions and scope of application of embodiments of the present disclosure.

Figure 6:
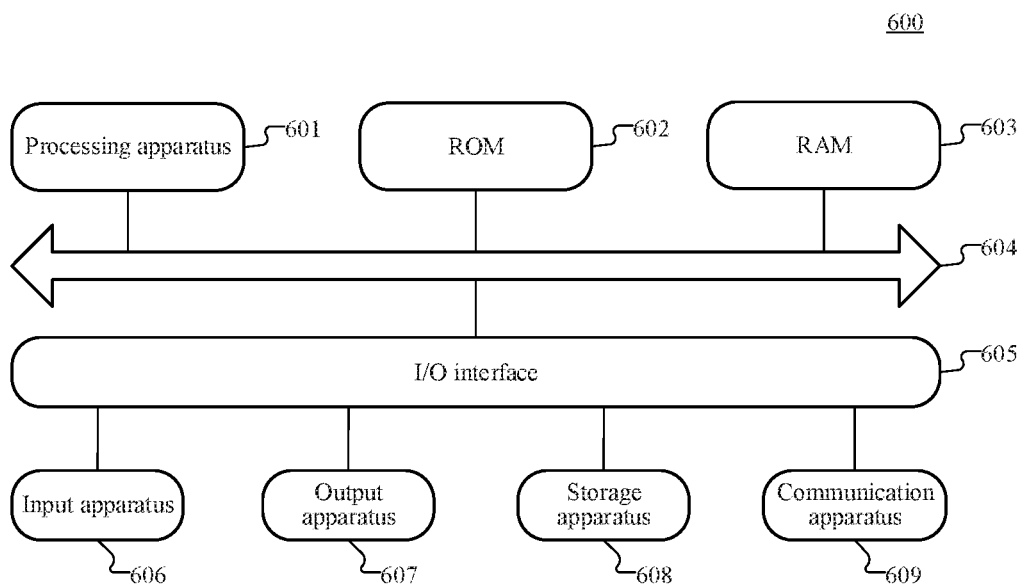
FIG. 6 is a schematic structural diagram of an electronic device adapted to implement some embodiments of the present disclosure.

As shown in FIG. 6, the electronic device 600 may include a processing apparatus (e.g., a central processing unit, a Graphics Processing Unit, etc.) 601, which may execute various appropriate operations and processes according to a program stored in a read-only memory (ROM) 602 or a program loaded into a random access memory (RAM) 603 from a storage apparatus 608. The RAM 603 also stores various programs and data required by the operations of the system 600. The processing apparatus 601, the ROM 602, and the RAM 603 are connected to each other through a bus 604. An input/output (I/O) interface 605 is also connected to the bus 604.

Generally, the following apparatuses may be connected to the I/O interface 605: an input apparatus 606 including, for example, a keyboard, a mouse, etc.; an output apparatus 607 including, for example, a liquid crystal display (LCD), a speaker, etc.; a storage apparatus 608 including, for example, a magnetic tape, a hard disk, etc.; and a communication apparatus 609. The communication apparatus 609 may allow wireless or wired communication between the computer system 600 and other device to exchange data. Although FIG. 6 illustrates the computer system 600 having various apparatuses, it should be understood that all the illustrated apparatuses are not required to be implemented or included. More or less apparatuses may be alternatively implemented or included. Each block shown in FIG. 6 may represent one apparatus or a plurality of apparatuses as required.

In particular, according to some embodiments of the present disclosure, the process described above with reference to the flowchart may be implemented in a computer software program. For example, an embodiment of the present disclosure includes a computer program product including a computer program loaded to a computer readable medium, the computer program including a program code for executing the method shown in the flowchart. In such an embodiment, the computer program may be downloaded and installed from a network via the communication apparatus 609, or installed from the storage apparatus 608, or installed from the ROM 602. The computer program, when executed by the processing apparatus 601, implements the above functions defined in the methods of some embodiments of the present disclosure. It should be noted that the computer readable medium according to some embodiments of the present disclosure may be a computer readable signal medium or a computer readable storage medium or a combination of the two. An example of the computer readable storage medium may be, but is not limited to: electric, magnetic, optical, electromagnetic, infrared, or semiconductor systems, apparatuses, elements, or any combination of the above. A more specific example of the computer readable storage medium may include but is not limited to: an electrical connection with one or more wires, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory, or any suitable combination of the above. In some embodiments of the present disclosure, the computer readable storage medium may be any tangible medium containing or storing programs which may be used by an instruction execution system, apparatus or device or incorporated thereto. In some embodiments of the present disclosure, the computer readable signal medium may include data signals in base bands or propagated as part of carriers, in which computer readable program codes are carried. The propagated data signals may be in various forms, including but not limited to: electromagnetic signals, optical signals or any suitable combination of the above. The computer readable signal medium may also be any computer readable medium beyond the computer readable storage medium. The computer readable medium is capable of sending, propagating or transmitting a program used by an instruction execution system, apparatus or device or a combination of them. The program codes included in the computer readable medium may be transmitted by any appropriate medium, including but not limited to a wire, an optical cable, RF (Radio Frequency), etc., or any appropriate combination of them.

The computer readable medium may be included in the above apparatus, or exists alone and is not assembled into the apparatus. The computer readable medium carries one or more programs, and when the one or more programs are executed by the apparatus, the apparatus is caused to: acquire traffic information of at least two dimensions of a target IP; determine whether the traffic information of the at least two dimensions contains traffic information exceeding an abnormal traffic threshold of a corresponding dimension of the target IP; and in response to determining that the traffic information of the at least two dimensions contains the traffic information exceeding the abnormal traffic threshold of the corresponding dimension, determine that the traffic of the target IP is abnormal.

Computer program codes for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program codes may be completely executed on a user's computer, partially executed on a user's computer, executed as a separate software package, partially executed on a user's computer and partially executed on a remote computer, or completely executed on a remote computer or a server. In the circumstance involving a remote computer, the remote computer may be connected to a user's computer through any network, including a local area network (LAN) or a wide area network (WAN), or connected to an external computer (for example, connected through Internet using an Internet service provider).

The flowcharts and block diagrams in the drawings illustrate system architectures, functions and operations that may be implemented according to the systems, methods and computer program products of various embodiments of the present disclosure. In this regard, each box in the flowcharts or block diagrams may represent a module, a program segment, or a part of a code, which includes one or more executable instructions for implementing the specified logical functions. It should be noted that, in some alternative implementations, the functions marked in the boxes may also be implemented in an order different from that marked in the drawing. For example, two consecutive boxes substantially may be executed in parallel, or sometimes executed in a reverse order, depending on the involved functions. It should also be noted that, each box in the block diagrams and/or flowcharts, and a combination of boxes in the block diagrams and/or flowcharts may be implemented by a dedicated hardware-based system for executing specified functions or operations, or implemented by a combination of dedicated hardware and computer instructions.

The units described in some embodiments of the present disclosure may be implemented by software or hardware. The units described may also be set in a processor, for example, described as a processor includes an information acquisition unit, a judgment unit, and an abnormality determination unit. The names of these units do not constitute limitations to the units themselves in some cases. For example, the information acquisition unit may also be described as "a unit for acquiring traffic information of at least two dimensions of a target IP".

The above description only provides an explanation of embodiments of the present disclosure and the technical principles used. It should be appreciated by those skilled in the art that the inventive scope of some embodiments of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for detecting traffic, comprising:
   periodically acquiring traffic information of a target IP;
   removing abnormal traffic information exceeding a preset value range from the acquired traffic information;
   determining an abnormal traffic threshold of the target IP based on the traffic information after removing the abnormal traffic information;
   acquiring traffic information of at least two dimensions of the target IP;
   determining whether the traffic information of the at least two dimensions contains traffic information exceeding an abnormal traffic threshold of a corresponding dimension of the target IP; and
   in response to determining that the traffic information of the at least two dimensions contains the traffic information exceeding the abnormal traffic threshold of the corresponding dimension, determining that the traffic of the target IP is abnormal.

2. The method according to claim 1, wherein the traffic information of the at least two dimensions comprises at least two of the following:
   bits transmitted per unit time, packets transmitted per unit time, requests per unit time, or connections per unit time.

3. The method according to claim 1, wherein the periodically acquiring traffic information of the target IP comprises:
   performing traffic acquisition on the target IP at a preset frequency; and
   determining, for sample data acquired each time, an interval in which the sample data is included, and determining a preset value within the interval as the traffic information acquired that time.

4. The method according to claim 1, wherein the removing abnormal traffic information exceeding a preset value range from the acquired traffic information comprises:
   removing abnormal traffic information exceeding a first value range from the acquired traffic information to obtain preliminarily screened traffic information;

determining a second value range based on the preliminarily screened traffic information, the second value range being smaller than the first value range; and
removing abnormal traffic information exceeding the second value range from the preliminarily screened traffic information.

5. The method according to claim 1, wherein the determining an abnormal traffic threshold of the target IP based on the traffic information after removing the abnormal traffic information comprises:
acquiring a set of traffic information obtained in a current period after removing the abnormal traffic information;
determining an interval in which a preset proportion of traffic information in the set is included, an upper limit of the interval being used as a reference threshold; and
amplifying the reference threshold by a preset multiple to obtain the abnormal traffic threshold of the target IP.

6. The method according to claim 1, wherein the determining an abnormal traffic threshold of the target IP based on the traffic information after removing the abnormal traffic information comprises:
acquiring a set of traffic information obtained in a plurality of periods after removing the abnormal traffic information, the plurality of periods comprising a current period and a plurality of historical periods;
determining, for the set of traffic information obtained in each period, an interval in which a preset proportion of traffic information in the set is included, an upper limit of the determined interval being used as a reference threshold corresponding to the period;
determining a final threshold based on the reference thresholds corresponding to the plurality of periods and corresponding weights; and
amplifying the final threshold by a preset multiple to obtain the abnormal traffic threshold of the target IP.

7. The method according to claim 6, wherein the weights of the plurality of periods are determined by one of the following approaches:
the weight of each period is the same;
the weight of the period close to the current period is greater than that of the period far from the current period; or
the weight of each period is determined based on the stability of the traffic information.

8. An apparatus for detecting traffic, comprising:
at least one processor; and
a memory storing instructions, the instructions when executed by the at least one processor, cause the at least one processor to perform operations, the operations comprising:
periodically acquiring traffic information of the target IP;
removing abnormal traffic information exceeding a preset value range from the acquired traffic information;
determining an abnormal traffic threshold of the target IP based on the traffic information after removing the abnormal traffic information;
acquiring traffic information of at least two dimensions of the target IP;
determining whether the traffic information of the at least two dimensions contains traffic information exceeding an abnormal traffic threshold of a corresponding dimension of the target IP; and
determining that the traffic of the target IP is abnormal in response to determining that the traffic information of the at least two dimensions contains the traffic information exceeding the abnormal traffic threshold of the corresponding dimension.

9. The apparatus according to claim 8, wherein the traffic information of the at least two dimensions comprises at least two of the following:
bits transmitted per unit time, packets transmitted per unit time, requests per unit time, or connections per unit time.

10. The apparatus according to claim 8, wherein the periodically acquiring traffic information of the target IP comprises:
performing traffic acquisition on the target IP at a preset frequency; and
determining, for sample data acquired each time, an interval in which the sample data is included, and determining a preset value within the interval as the traffic information acquired that time.

11. The apparatus according to claim 8, wherein the removing abnormal traffic information exceeding a preset value range from the acquired traffic information comprises:
removing abnormal traffic information exceeding a first value range from the acquired traffic information to obtain preliminarily screened traffic information;
determining a second value range based on the preliminarily screened traffic information, the second value range being smaller than the first value range; and
removing abnormal traffic information exceeding the second value range from the preliminarily screened traffic information.

12. The apparatus according to claim 8, wherein the determining an abnormal traffic threshold of the target IP based on the traffic information after removing the abnormal traffic information comprises:
acquiring a set of traffic information obtained in a current period after removing the abnormal traffic information;
determining an interval in which a preset proportion of traffic information in the set is included, an upper limit of the interval being used as a reference threshold; and
amplifying the reference threshold by a preset multiple to obtain the abnormal traffic threshold of the target IP.

13. The apparatus according to claim 8, wherein the determining an abnormal traffic threshold of the target IP based on the traffic information after removing the abnormal traffic information comprises:
acquiring a set of traffic information obtained in a plurality of periods after removing the abnormal traffic information, the plurality of periods comprising a current period and a plurality of historical periods;
determining, for the set of traffic information obtained in each period, an interval in which a preset proportion of traffic information in the set is included, an upper limit of the determined interval being used as a reference threshold corresponding to the period;
determining a final threshold based on the reference thresholds corresponding to the plurality of periods and corresponding weights; and
amplifying the final threshold by a preset multiple to obtain the abnormal traffic threshold of the target IP.

14. The apparatus according to claim 13, wherein the weights of the plurality of periods are determined by one of the following approaches:
the weight of each period is the same;
the weight of the period close to the current period is greater than that of the period far from the current period; or
the weight of each period is determined based on the stability of the traffic information.

15. A non-transitory computer readable medium storing a computer program, wherein the computer program, when executed by a processor, causes the processor to perform operations, the operations comprising:

periodically acquiring traffic information of the target IP;

removing abnormal traffic information exceeding a preset value range from the acquired traffic information;

determining an abnormal traffic threshold of the target IP based on the traffic information after removing the abnormal traffic information;

acquiring traffic information of at least two dimensions of the target IP;

determining whether the traffic information of the at least two dimensions contains traffic information exceeding an abnormal traffic threshold of a corresponding dimension of the target IP; and determining that the traffic of the target IP is abnormal in response to determining that the traffic information of the at least two dimensions contains the traffic information exceeding the abnormal traffic threshold of the corresponding dimension.

* * * * *